United States Patent [19]

White et al.

[11] Patent Number: 5,212,890

[45] Date of Patent: May 25, 1993

[54] ACCESS AREA MEASUREMENT APPARATUS

[76] Inventors: Glen W. White, 2608 Bond Pl.; R. Mark Mathews, 2712 Stratford Rd., both of Lawrence, Kans. 66049

[21] Appl. No.: 781,493

[22] Filed: Oct. 22, 1991

[51] Int. Cl.$^5$ .................. B43L 7/027; G01C 3/04; G01C 3/56

[52] U.S. Cl. .................. 33/451; 33/476; 33/494

[58] Field of Search .............. 33/451, 476, 494, 459, 33/421, 429, 474, 480, 483

[56] References Cited

U.S. PATENT DOCUMENTS

| | | | |
|---|---|---|---|
| 257,515 | 5/1882 | Pope | 33/476 |
| 884,773 | 4/1908 | Stark | 33/451 |
| 1,298,010 | 3/1919 | Coleman | 33/451 |
| 1,643,695 | 9/1927 | Bunger | 33/476 |
| 1,754,035 | 4/1930 | Morren | 33/451 |
| 2,627,115 | 2/1953 | Pippin | 33/451 |
| 3,210,850 | 10/1965 | Grzyb | 33/759 |
| 4,301,596 | 11/1981 | Sedlock | 33/494 |
| 4,693,011 | 9/1987 | Strayham | 33/451 |
| 4,811,489 | 3/1989 | Walker | 33/476 |
| 4,823,469 | 4/1989 | Broselow | 33/760 |

FOREIGN PATENT DOCUMENTS 277902 9/1927 United Kingdom .............. 33/451

*Primary Examiner*—Thomas B. Will
*Attorney, Agent, or Firm*—Hovey, Williams, Timmons & Collins

[57] ABSTRACT

An access area measurement apparatus includes a first elongated arm member of a defined length. A second arm member is fixed to and extends at a right angle from one end of the first arm member, and is shorter than the first arm member. The first arm member has a level to indicate that relative slope of a surface when the apparatus is placed on such a surface. The apparatus first arm member also includes a plurality of indicia for measuring compliance with ANSI and ADA accessibility standards.

7 Claims, 1 Drawing Sheet

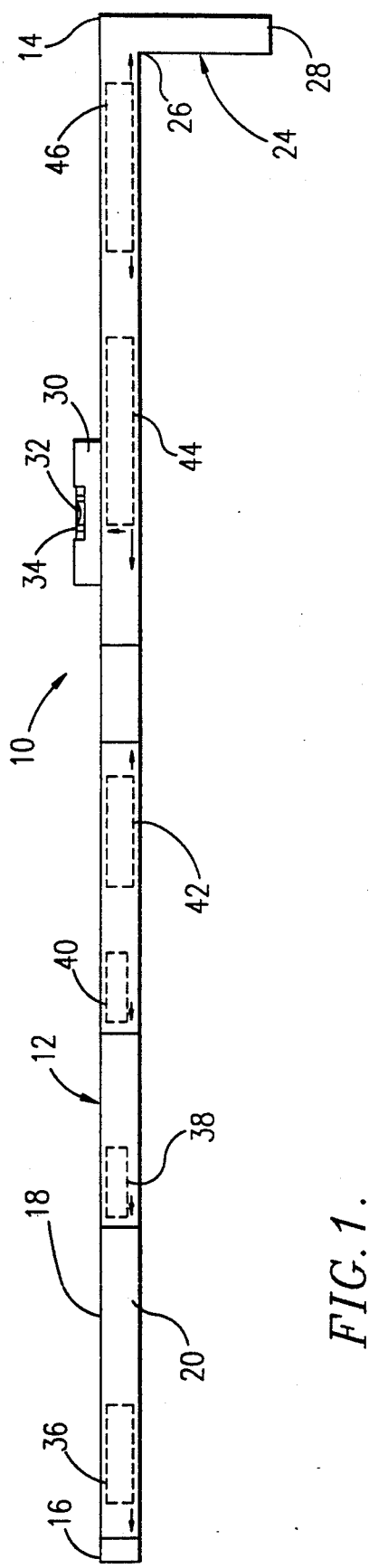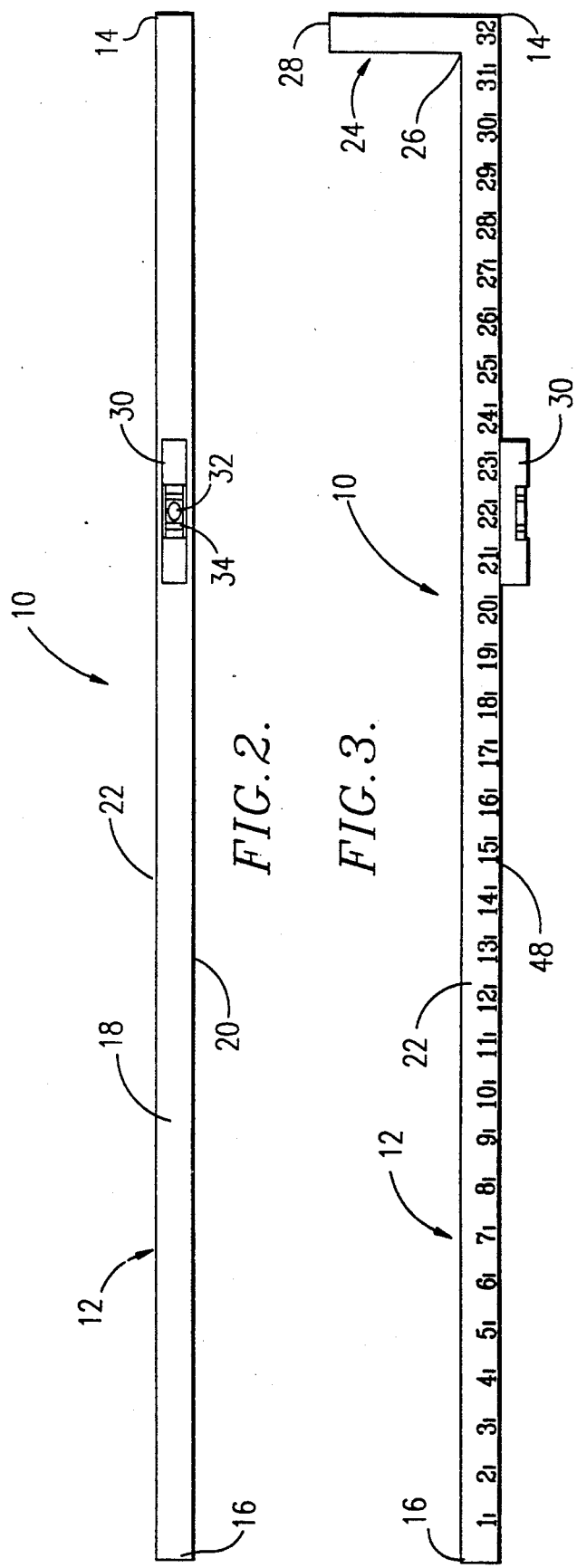

ACCESS AREA MEASUREMENT APPARATUS

BACKGROUND OF THE INVENTION

1. Field of the Invention

The present invention relates generally to measurement devices, and in particular to an apparatus for measuring a variety of spacial dimensions in and around building access areas. The acceptable ranges of these dimensions have been standardized by the American National Standards Institute and are of particular significance to persons having special needs in the area of building accessibility.

2. Discussion of the Prior Art

Means for determining spacial dimensions are well known. In most contexts, such means involve a variety of devices, ranging from the simple ruler to much more sophisticated items such as surveying equipment incorporating laser technology.

The ruler or other comparable device for measuring linear distances has been in use since ancient times. More recently, this relatively simple tool has been modified and adapted for particular applications. For example, U.S. Pat. No. 1,192,418 discloses a ruler adapted for measuring and holding in place a door jamb while the door casing is being constructed. In U.S. Pat. No. 3,088,208, a ruler is disclosed, including a mechanism for providing a trouser length gauge. U.S. Pat. No. 4,648,185 discloses a tool for accurately marking a pair of points on a horizontal or vertical line, including a bubble gauge for enabling the user to assure that a particular measurement is horizontally or vertically level. A combination rule, horizontal level, vertical plumb and straight edge is disclosed in U.S. Pat. No. 4,660,292.

All of the foregoing art, as well as innumerable related devices, have as their purpose the provision of systems for accurately measuring spacial dimensions during, for example, construction of buildings and other facilities. There are other equally pragmatic purposes involving the measurement of dimensions, however, which are not served by the existing art, but which are nonetheless present in everyday life. For example, dimensions of access points to buildings, sidewalks, and the like which are suitable for the population at large, may represent obstacles to individuals whose mobility may be limited. For such persons, access dimensions can have crucial importance.

The fact that there is little art directed to measuring dimensions in the special needs context is simply a reflection of a cultural failure to appreciate and address this issue. In the past several decades, however, there has been an increase in cultural awareness concerning the needs of persons whose access to buildings and other facilities is limited. For example, the American National Standards Institute (ANSI) has developed a series of code requirements for physical accessibility by persons with disabilities which have been adapted by several states for regulating the construction and remodeling of all government and public buildings. These codes may be used in design and construction of apartments, houses, public buildings and other environmental spaces, and have been recognized as standards by the United States Government. As a result of the recent implementation of the federal Americans with Disabilities Act (P.L. 101-336), which were partly based on the ANSI code, the code will have an increasing significance in American life.

SUMMARY OF THE INVENTION

It is therefore an object of the present invention to provide an access area measurement apparatus adapted to conveniently provide a user with means for determining whether a given slope meets ANSI building accessibility standards and the Americans with Disabilities Act (ADA) standards.

Another object of the invention is to provide an access area measurement apparatus which will enable a user to conveniently determine whether a variety of other particular environmental dimensions have been constructed in compliance with applicable ANSI standards and the ADA standards.

Yet another object of the invention is to provide an access area measurement apparatus adapted to be utilized conveniently as a means for making common linear measurements.

A further object of the invention is to provide an access area measurement apparatus particularly adapted to combine in one instrument a means for determining whether a given slope meets ANSI and ADA standards, for evaluation of compliance with ANSI and ADA standards in other environmental dimensions, and for making certain common linear measurements.

In accordance with the invention, an access area measurement apparatus comprises a first elongated body or arm member of a defined length. A second arm member or handle, of a determined length shorter than the first, is affixed to one end of the first body or arm member, and extends at a right angle thereto. The upper surface of the first body or arm member includes indicating means, and in particular a bubble glass level disposed thereon, in such manner that it will enable a user to determine whether a given slope is within the ANSI code requirement or ADA standard, when the apparatus is placed on the slope so that the first body or arm member extends up the slope, while the handle or second arm member acts as a "leg" for the apparatus. The body or first arm member also includes a number of length measuring means or measuring indicia, relating to other dimensional standards set by ANSI.

BRIEF DESCRIPTION OF THE DRAWING FIGURES

A preferred embodiment of the invention is described in detail below with reference to the attached drawing figures, wherein:

FIG. 1 is a side elevation of an access area measurement apparatus, constructed in accordance with the preferred embodiment.

FIG. 2 is a top plan view of the access area measurement apparatus of FIG. 1.

FIG. 3 is a side elevation of the access area measurement apparatus, illustrating the obverse side of the apparatus as depicted in FIG. 1.

DETAILED DESCRIPTION OF THE PREFERRED EMBODIMENT

An access area measurement apparatus 10 constructed in accordance with the preferred embodiment of the present invention is illustrated in FIG. 1. It includes an elongated body or first arm member 12 having a first end 14 and a second end 16. The first arm member 12 also has a top surface 18, and opposed side surfaces 20 and 22 (see FIG. 3). The elongated body is preferably $\frac{3}{4}'' \times \frac{3}{4}'' \times 32''$ and is formed of wood or other known material suitable for the purpose.

The access area measurement apparatus 10 has a handle or second arm member 24, which includes first and second ends 26 and 28. In the illustrated example, second arm member 24 is affixed at its first end 26 to the first end 14 of first arm member 12. Second arm member 24 therefore extends at a right angle from first arm member 12. The handle is preferably 2.66" long so that the angle of the hypotenuse relative to the base defined by the body is a 1:12 slope, which corresponds to the maximum allowed angle of the ramp surface as set forth in applicable ANSI and ADA standards.

FIGS. 1, 2 and 3 all illustrate that the top surface 18 of first arm member 12 includes an indicating means or level 30. In the conventional manner, level 30 has a moveable water bubble 32 and a plurality of bubble lines 34. As will be discussed in more detail below, the level 30 is incorporated in the apparatus 10 for a particular purpose.

FIG. 1 also illustrates that the preferred embodiment of the present invention includes several indicia. Indicium 36 pertains to ANSI and ADA standard 4.13.8 which requires that all non-sliding door thresholds have a maximum height of ½ inch. Indicia 38 and 40 reflect ANSI standard 4.9.2 for stair height (maximum 7 inches) and an ANSI and ADA standards for stair width (minimum 11 inches) respectively. Indicium 42 illustrates the ANSI and ADA watercloset height standard (4.16.3), which requires that the top of a toilet seat must be between 17 and 19 inches from the floor surface. Indicium 44 is used in conjunction with level 30 to determine compliance with ANSI and ADA slope standards for ramps (4.8.2) and curb ramps (4.7.2), each of which require that maximum slope not exceed a 1:12 ratio.

As illustrated in FIG. 1, indicium 46 relates to the ANSI and ADA standard (4.13.5) for minimum doorway clearance, which is established at 32 inches. The plurality of indicia 48 illustrated in FIG. 3 represent linear inch markings corresponding to the thirty-two inch ANSI standard for door widths.

As illustrated in the preferred embodiment, the present invention has numerous uses in assisting a user to determine compliance of a structure with ANSI codes. Of particular significance to persons with special accessibility needs is the relative slope of a sidewalk, driveway, parking lot, ramp or other access point. The apparatus 10 may be used to determine whether a particular slope meets ANSI and ADA requirements. This is done by placing the apparatus 10 on the slope, with the elongated body or first arm member 12 extending up the slope, and the handle or second arm member 24 acting as a "leg" for the apparatus 10. Thus the second end 28 of handle 24 and the second end 16 of body 12 are placed against the ground and apparatus 10 is held so that the body 12 and handle 24 extend outward of the ground within a plane which is perpendicular to the ground. In this posture, the top surface 18 of the arm member 12 is presented directly to the user, with the level 30 in plain view.

The user can determine whether the slope is graded in compliance with the ANSI and ADA standard by considering the water bubble 32 in relation to slope indicium 44 which includes the wording "bubble should NOT exceed this line to meet code (point stick up ramp this way). The preferred embodiment of the present invention is so constructed that when it is placed on a slope, as above described, it will indicate that a given slope complies with the ANSI standard if the bubble 32 does not rise above indicium 44.

Although the first and second arm members 12, 24 are illustrated as being of fixed length, it would be possible to provide a telescoping member, or other equivalent adjustable construction, which would permit the length of that member relative to the other member to be varied. This alternate construction would be useful where standards included two or more acceptable slope ratios for various curves, lengths and/or ramps of access areas. For example, if a standard were adapted which permitted slopes to have a maximum angle not exceeding a 1:16 ratio, it would be possible to provide a measurement apparatus having a second arm which is adjustable in length between a first length defining a 1:12 ratio and a second length defining a 1:16 ratio, with accompanying suitable indicia provided on the apparatus to assist in the operation thereof.

Other uses may be made of the preferred embodiment of the present invention. For example, the first arm member 12 is marked with indicium 36, which may include the language "threshold should NOT exceed colored area". The user can examine a given threshold by placing apparatus 10 next to the threshold so as to compare its height with the marking of indicium 36. If the threshold is at or below the indicium 36, it is in compliance with the ANSI and ADA standard of ½ inch.

Similar use of the invention may be made with respect to stairs or steps. As illustrated in FIG. 1, indicium 38 may be used to determine whether a given stair or step complies with the ANSI standard for maximum stair height. This may be done by placing second end 16 of arm member 12 on the ground, and comparing the top of the first step with indicium 38. Likewise, the apparatus 10 may be placed on a stair or step, and the distance between the second end 16 of arm member 12 and indicium 40, e.g. including the wording "maximum step height", may be compared, to determine whether the ANSI and ADA standard for minimum stair width has been met.

The apparatus 10 may also be utilized to determine whether the ANSI and ADA standard for watercloset height has been met. This is done by placing the second end 16 of arm member 12 on the floor, and comparing the toilet seat height with indicium 42 including the language "toilet seat height should be within colored area. If the top of the toilet seat falls anywhere within the ambit of indicium 42, the watercloset is in compliance with the ANSI and ADA standard.

Another dimension of particular importance to those with special accessibility needs is the width of doorways. The apparatus 10 may be used to determine compliance with the ANSI and ADA standard for this dimension by simply placing the apparatus 10 in the doorway so that first end 14 is at or near one side of the door jamb, while second end 16 is at or near the opposite side of the door jamb with the door opened at 90°. If the apparatus 10 thus fits within the doorway, the opening complies with the ANSI and ADA standard.

As illustrated in FIG. 3, the preferred embodiment of the apparatus 10 includes on its second side surface 22 a plurality of linear distance indicia 48, e.g. including the wording "stick width should pass through doorway to meet 32 inch code". In this example, the indicia 48 are at thirty-two one inch intervals, corresponding with the thirty-two inch ANSI and ADA code requirement for doorway openings, which is marked by indicium 46 on first side surface 20. Second side surface 22 may thus be used as a thirty-two inch ruler. This feature can also be used to determine whether the ANSI and ADA standards of 27 inch clearance under tables, work counters or sinks has been satisfied. It can also be used to determine if wall mounted drinking fountains knee space clearance meet ANSI and ADA standards whether minimum required stair handrail extensions (12 inches) have been complied with, and whether the ANSI code requirement of 24 inches, and ADA guideline requirement of 18 inches for sufficient clearance for maneuvering near doorways has been satisfied.

Although the invention has been described with reference to the illustrated preferred embodiment, it is noted that variations and changes may be made and equivalents employed herein without departing from the scope of the invention as recited in the claims.

We claim:

1. A measurement apparatus for use in determining whether the slop of a ramp of an access area is equal to or less than the necessary angle required for the ramp to comply with applicable code requirements concerning access ramp angles, the apparatus comprising:

an elongated body having first and second axial ends separated from one another by a first predetermined length;

an elongated handle provided on the body at the first axial end, the handle extending in a direction transverse to the length of the body and having a tip spaced from the body by a second predetermined length, the first and second predetermined lengths defining the base and side of a right-angled triangle having a hypotenuse extending between the tip of the handle and the second end of the body, the hypotenuse being angle relative to the base by a predetermined angle corresponding to the necessary angle;

a level including a movable bubble and being provided on the body for indicating when the body is disposed in a horizontal plane such that when the tip of the handle and the second end of the body are placed in contact with the ramp an indication is provided as to whether the slope of the ramp is equal to the necessary angle;

indicia provided on the body adjacent the level for indicating a position on the level beyond which the bubble must be located in order for the slop of the ramp to be less than or equal to the necessary angle required; and length measuring means provided on the body for indicating whether one or more dimensions of the access area fall within a necessary range of lengths to comply with applicable code requirements concerning access area dimensions.

2. The apparatus as set forth in claim 1 wherein the length measuring means includes indicia indicating compliance with the ANSI and ADA doorway opening standard of 32 inches.

3. The apparatus as set forth in claim 1 wherein the length measuring means includes indicia indicating compliance with the ANSI and ADA ramp standard which requires that a given slope not exceed a 1:12 ratio.

4. The apparatus as set forth in claim 1 wherein the length measuring means includes indicia indicating compliance with the ANSI and ADA threshold height standard of ½ inch.

5. The apparatus as set forth in claim 1 wherein the length measuring means includes indicia indicating compliance with the ANSI maximum stair height standard of 7 inches.

6. The apparatus as set forth in claim 1 wherein the length measuring means includes indicia indicating compliance with the ANSI and ADA minimum stair with standard of 11 inches.

7. The apparatus as set forth in claim 1 wherein the length measuring means includes indicia indicating compliance with the ANSI and ADA watercloset height standard which requires that the top of a toilet seat must be within 17 to 19 inches above a floor surface.

* * * * *